US 12,208,843 B2

(12) United States Patent
Laurin et al.

(10) Patent No.: US 12,208,843 B2
(45) Date of Patent: *Jan. 28, 2025

(54) OUTDOOR POWER EQUIPMENT WITH SINGLE HANDED CONTROLS

(71) Applicant: Briggs & Stratton LLC, Wauwatosa, WI (US)

(72) Inventors: Robert Laurin, Durhamville, NY (US); Derrick Camenga, Sherburne, NY (US); James Marshall, Munnsville, NY (US); Joe Ferris, Wauwatosa, WI (US); Tom Burkard, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,328

(22) Filed: Nov. 21, 2023

(65) Prior Publication Data
US 2024/0083524 A1   Mar. 14, 2024

Related U.S. Application Data

(63) Continuation of application No. 16/893,943, filed on Jun. 5, 2020, now Pat. No. 11,827,294.

(60) Provisional application No. 62/858,778, filed on Jun. 7, 2019.

(51) Int. Cl.
| | |
|---|---|
| *B62D 51/00* | (2006.01) |
| *A01D 34/69* | (2006.01) |
| *A01D 34/82* | (2006.01) |
| *B62D 51/04* | (2006.01) |
| *A01D 34/68* | (2006.01) |
| *A01D 101/00* | (2006.01) |

(52) U.S. Cl.
CPC .......... *B62D 51/001* (2013.01); *A01D 34/69* (2013.01); *A01D 34/824* (2013.01); *B62D 51/004* (2013.01); *B62D 51/04* (2013.01); *A01D 2034/6843* (2013.01); *A01D 2101/00* (2013.01)

(58) Field of Classification Search
CPC .... B62D 51/001; B62D 51/004; B62D 51/04; A01D 34/69; A01D 34/824; A01D 2034/6843
See application file for complete search history.

(56) References Cited

U.S. PATENT DOCUMENTS

| | | | |
|---|---|---|---|
| 4,209,964 | A | 7/1980 | Fuelling, Jr. et al. |
| 5,263,385 | A | 11/1993 | Hirata et al. |
| 5,375,674 | A | 12/1994 | Peter |
| 5,644,903 | A | 7/1997 | Davis, Jr. |
| 6,454,032 | B1 | 9/2002 | Teal et al. |
| 6,640,526 | B2 | 11/2003 | Velke et al. |
| 6,769,501 | B2 | 8/2004 | Iida et al. |
| 7,644,781 | B2 | 1/2010 | Moriyama et al. |

(Continued)

*Primary Examiner* — Abigail A Risic
(74) *Attorney, Agent, or Firm* — Foley & Lardner LLP

(57) ABSTRACT

Outdoor power equipment includes a frame including a handle, a prime mover mounted to the frame, a transmission coupling the prime mover to a wheel, and a user interface coupled to the transmission and including a static link rigidly coupled to the handle, a forward link coupled to a forward lever and to the static link, a reverse link coupled to a reverse lever and to the static link, and a joining link coupled between the forward link and the reverse link. The user interface is actuatable between a forward configuration and a reverse configuration.

20 Claims, 18 Drawing Sheets

(56) References Cited

U.S. PATENT DOCUMENTS

| | | |
|---|---|---|
| 8,096,374 B1 | 1/2012 | Papke et al. |
| 8,733,072 B2 | 5/2014 | Hansen et al. |
| 10,464,587 B2 | 11/2019 | Schmalz |
| 2003/0192295 A1* | 10/2003 | Busboom ........... A01D 34/6806 56/16.7 |
| 2008/0121491 A1 | 5/2008 | Ito et al. |
| 2009/0126526 A1 | 5/2009 | Iino et al. |
| 2013/0175105 A1 | 7/2013 | Gallazzini |
| 2018/0135748 A1 | 5/2018 | Shoji |

* cited by examiner

OUTDOOR POWER EQUIPMENT WITH SINGLE HANDED CONTROLS

CROSS REFERENCE TO RELATED APPLICATIONS

This application is a Continuation of U.S. patent application Ser. No. 16/893,943, filed on Jun. 5, 2020, which claims the benefit of and priority to U.S. Provisional Patent Application No. 62/858,778, filed on Jun. 7, 2019, each of which is incorporated by reference herein.

BACKGROUND

The present invention relates generally to a user interface for outdoor power equipment. More specifically, the present invention relates to a manually manipulated linkage for controlling outdoor power equipment.

SUMMARY

At least one embodiment relates to outdoor power equipment that includes a frame including a handle, a prime mover mounted to the frame, a transmission coupling the prime mover to a wheel, and a user interface coupled to the transmission and including a static link rigidly coupled to the handle, a forward link coupled to a forward lever and to the static link, a reverse link coupled to a reverse lever and to the static link, and a joining link coupled between the forward link and the reverse link. The user interface is actuatable between a forward configuration and a reverse configuration.

Another embodiment relates to a user interface that includes a static link rigidly coupled to a handle, a forward link coupled to a forward lever and to the static link, a reverse link coupled to a reverse lever and to the static link, and a joining link coupled between the forward link and the reverse link. The user interface is actuatable between a forward configuration and a reverse configuration.

Still another embodiment relates to a user interface that includes a static linkage, a first linkage coupled to the static linkage, a second linkage coupled to the static linkage, a joining linkage coupled between the first linkage and the second linkage, a first handlebar coupled to the first linkage, a second handlebar coupled to the second linkage, and a control rod. The control rod is coupled to the first linkage or the second linkage so that the pivotal movement of the first handlebar or the second handlebar results in movement of the control rod between a forward and a reverse position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a user interface for outdoor power equipment includes an actuation system that can be manipulated with a single hand of a user. For example, the user may user either a right hand or a left hand to actuate the outdoor power equipment between forward travel and rearward travel. The outdoor power equipment may include a walk behind lawn mower, a snow thrower, or another type of outdoor power equipment. The outdoor power equipment includes a handle that is graspable by the user to direct movement of the outdoor power equipment, a prime mover (e.g., a gasoline internal combustion engine, an electric motor, etc.), a transmission coupled to the prime mover, and a control mechanism connecting the user interface to the transmission. The user interface includes a forward lever, a reverse lever, and a mechanical linkage arranged between the forward lever and the reverse lever. The mechanical linkage provides a movement profile for the forward lever defining an upper movement limit during engagement of the reverse lever. In some embodiments, the upper movement limit is defined as a maximum of half and inch (0.5") above a top surface of the handle. The upper movement limit is sized to allow the user to grasp the handle securely while the reverse lever is engaged. In other words, the user can grasp the handle with a single hand to control the outdoor power equipment while engaging the reverse lever and moving the reverse lever to an actuated position.

Figure 1:
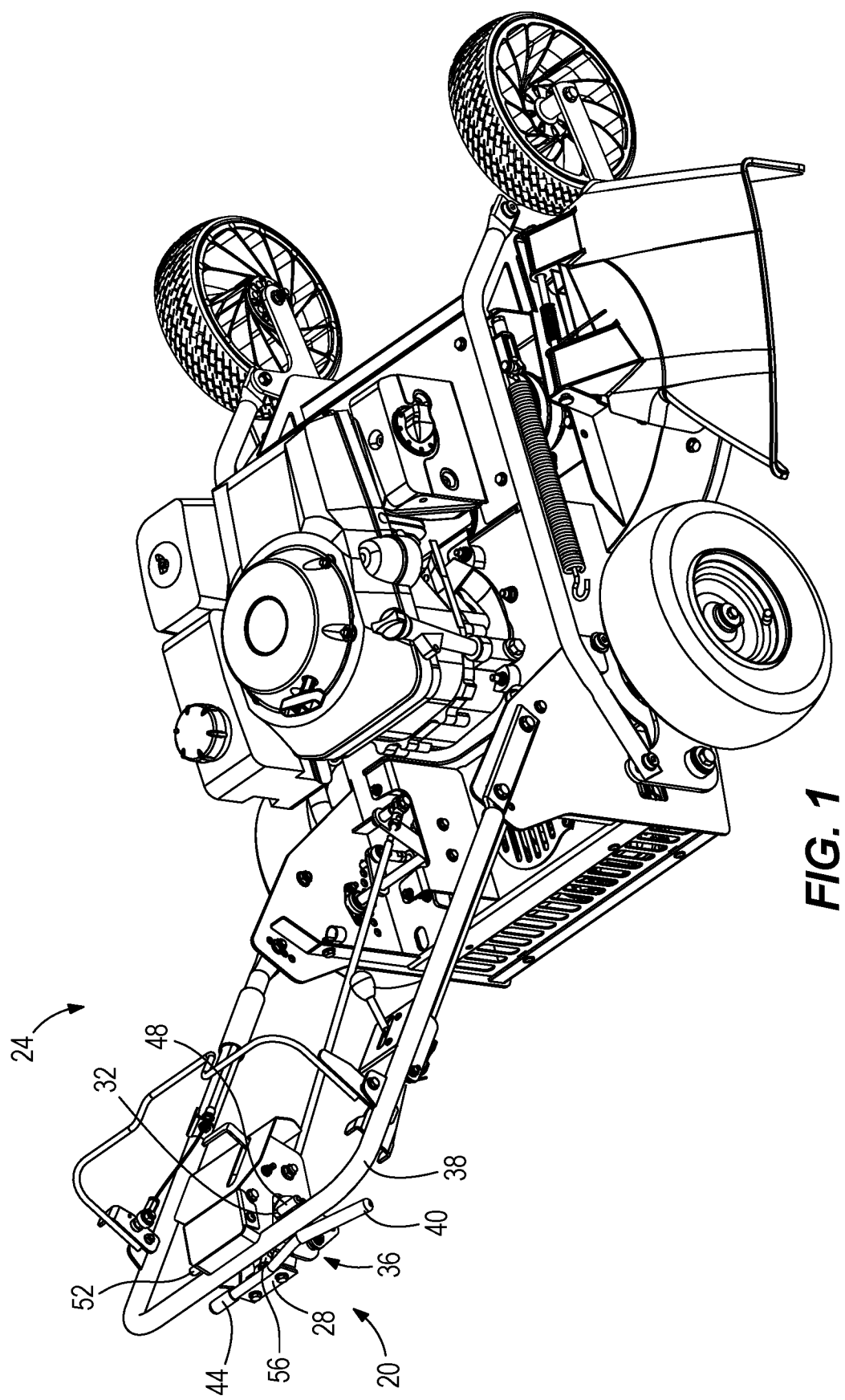
FIG. 1 is a perspective view of a user interface for a walk behind lawn mower arranged in a neutral configuration according to some embodiments.

As shown in FIG. 1, a user interface 20 of an outdoor power equipment 24 is actuatable by the user between a neutral configuration, a forward configuration, and a reverse configuration to control motion of the outdoor power equipment 24. The user interface 20 includes a forward lever 28 structured to move between a neutral configuration (see FIGS. 2 and 3) corresponding to the neutral configuration of the user interface 20, a forward position (see FIGS. 8-11) corresponding to the forward configuration of the user interface 20, and a reverse position corresponding to the reverse configuration of the user interface 20 (see FIGS. 4-7).

The user interface 20 also includes a reverse lever 32 structured to move between a neutral position corresponding to the neutral configuration (see FIGS. 2 and 3) of the user interface 20, a forward position (see FIGS. 8-11) corresponding to the forward configuration of the user interface 20, and a reverse position corresponding to the reverse configuration of the user interface 20 (see FIGS. 4-7).

The user interface 20 further includes a mechanical linkage 36 coupling the forward lever 28 to the reverse lever 32. The user interface 20 is coupled to a handle 38 of the outdoor power equipment 24 that is structured to allow the user to direct movement of the outdoor power equipment 24 during use. In some embodiments, the outdoor power equipment 24 is a walk behind lawn mower. In some embodiments, the outdoor power equipment is another type of walk behind equipment such as a snow thrower, a leaf blower, a debris loader, an overseeder, a power rake, an aerator, a sod cutter, a brush cutter, a pavement surface prep machines, an auger, or another type of walk behind machine.

Figure 2:
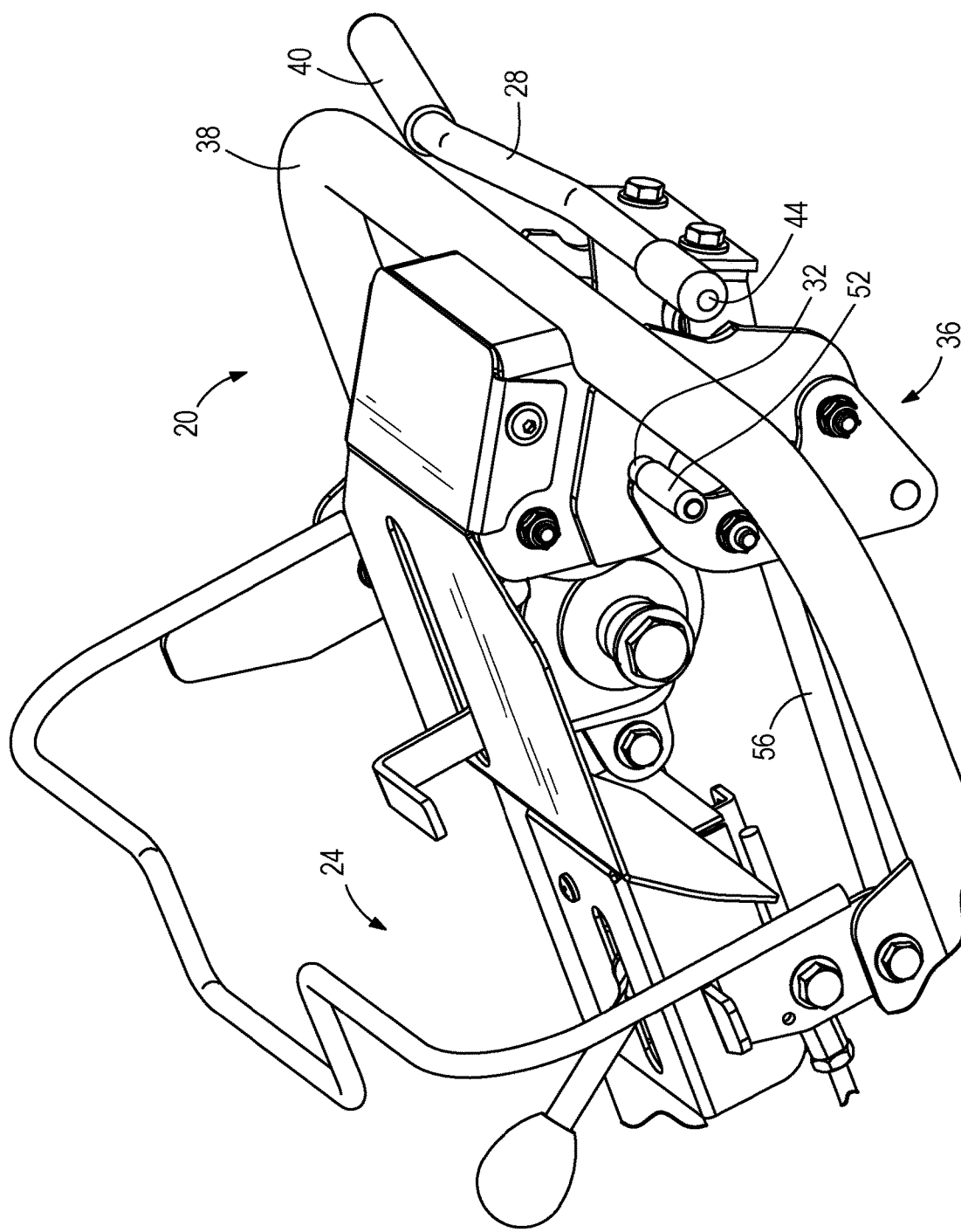
FIG. 2 is a perspective view of the user interface of FIG. 1 arranged in the neutral configuration.

As shown in FIG. 2, the forward lever 28 includes a primary grip 40 and a secondary grip 44. In some embodiments, the primary grip 40 is dimensionally larger than the secondary grip 44. The primary grip 40 and the secondary grip 44 are ergonomically shaped and can include a padded grip surface. The forward lever 28 is coupled to the mechanical linkage 36 with fasteners or another removable coupling structure so that the orientation of the primary grip 40 and the secondary grip 44 can be changed. For example, a right handed user would prefer the primary grip 40 to be positioned on a right side of the outdoor power equipment 24.

Figure 3:
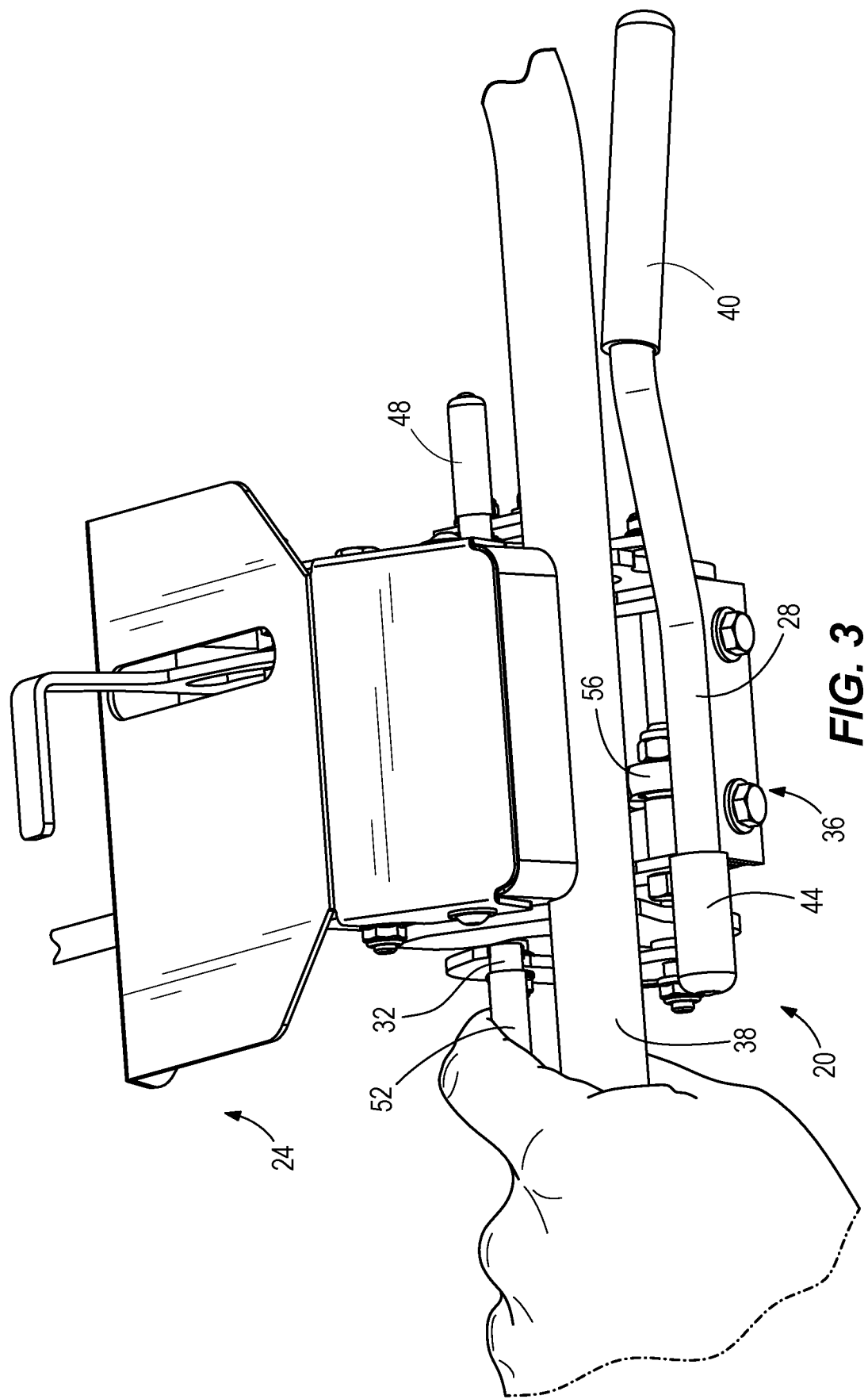
FIG. 3 is a perspective view of the user interface of FIG. 1 arranged in the neutral configuration.

As shown in FIG. 3, the reverse lever 32 includes a right grip 48 and a left grip 52 rigidly coupled together. In some embodiments, the right grip 48 and the left grip 52 are formed from separate components and rigidly coupled together with fasteners and/or rods. In some embodiments, the right grip 48 and the left grip 52 are formed as a single piece (e.g., a stamped metal).

Figure 4:
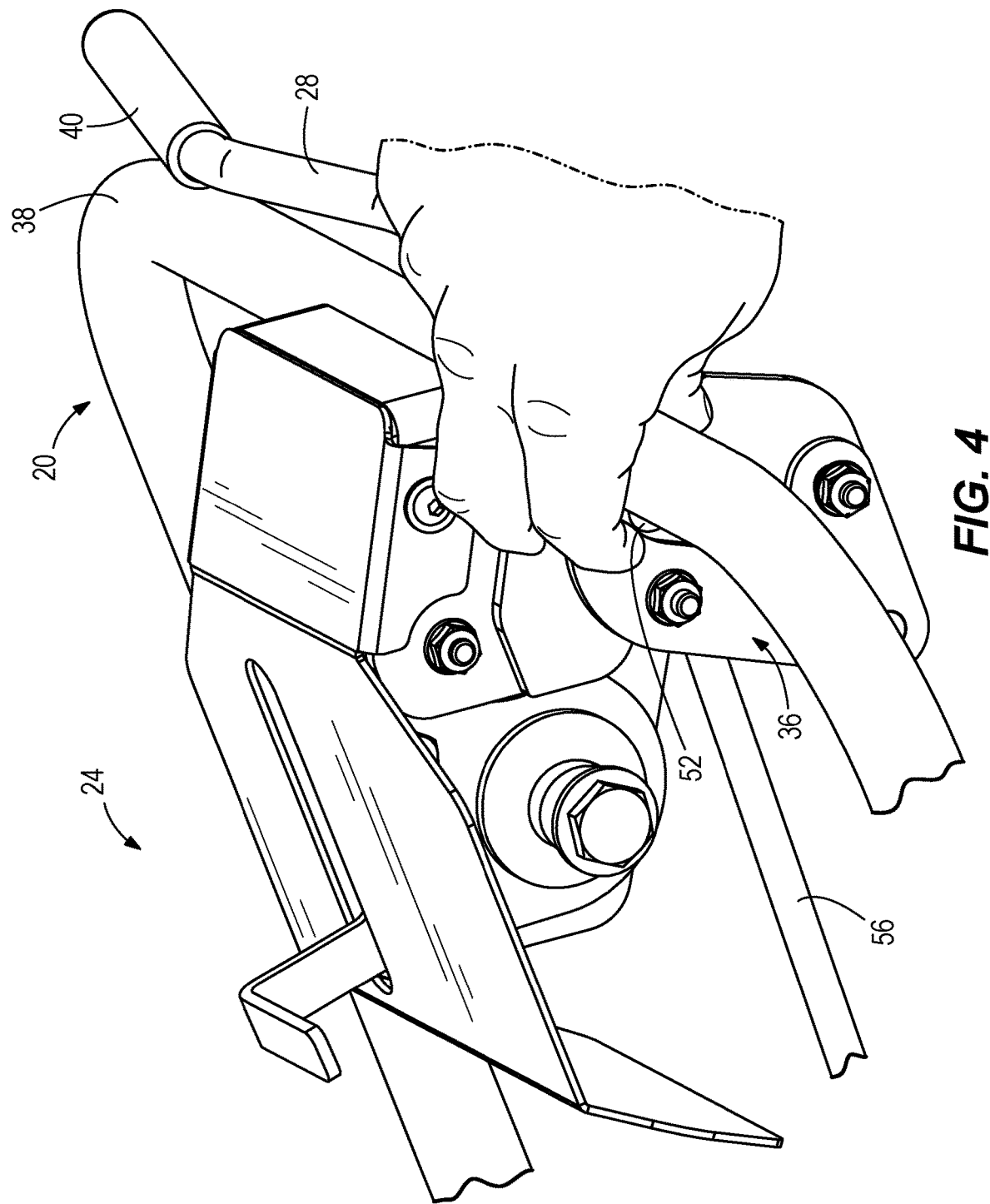
FIG. 4 is a perspective view of the user interface of FIG. 1 arranged in a reverse configuration.
Figure 5:
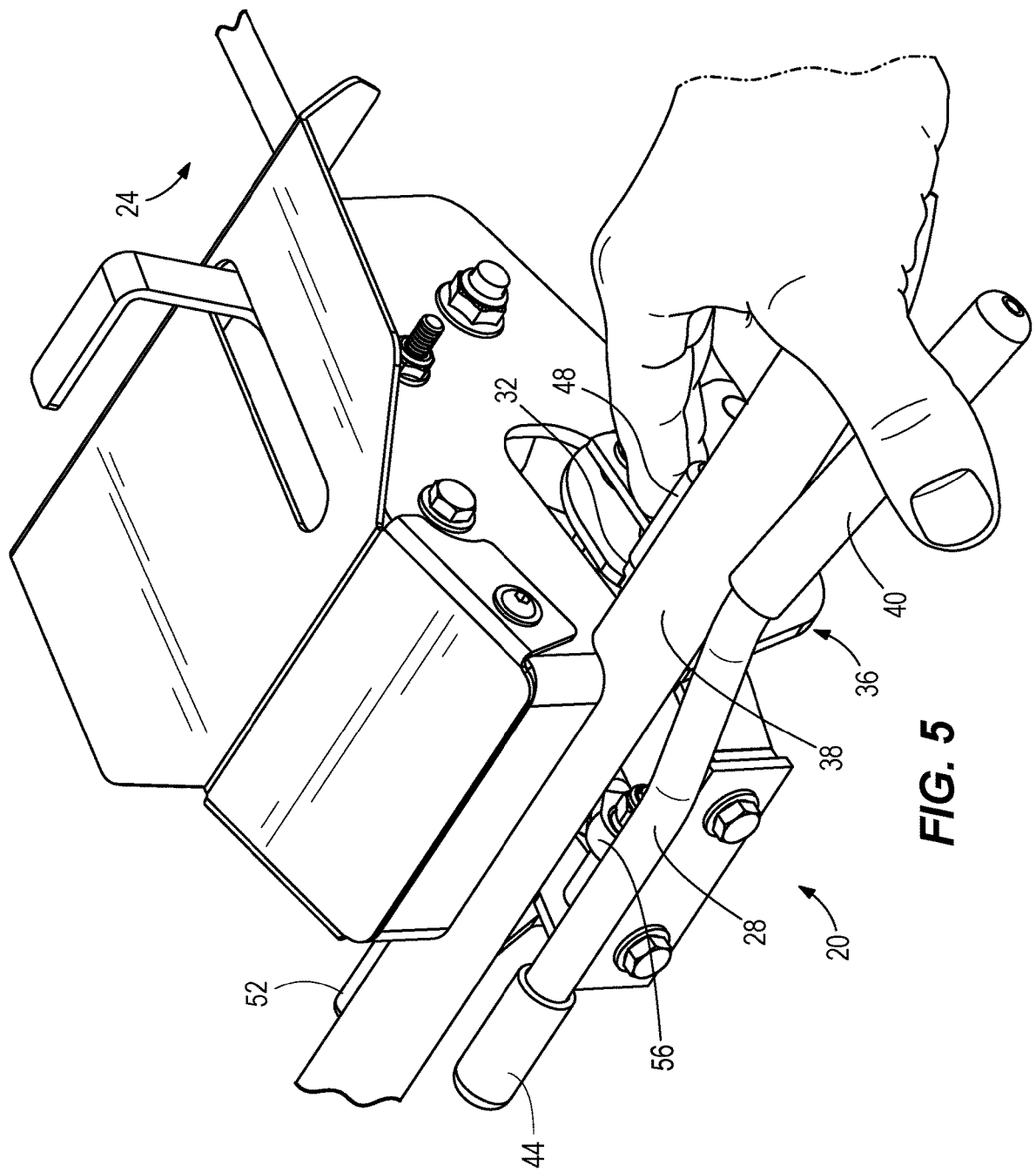
FIG. 5 is a perspective view of the user interface of FIG. 1 arranged in the reverse configuration.
Figure 6:
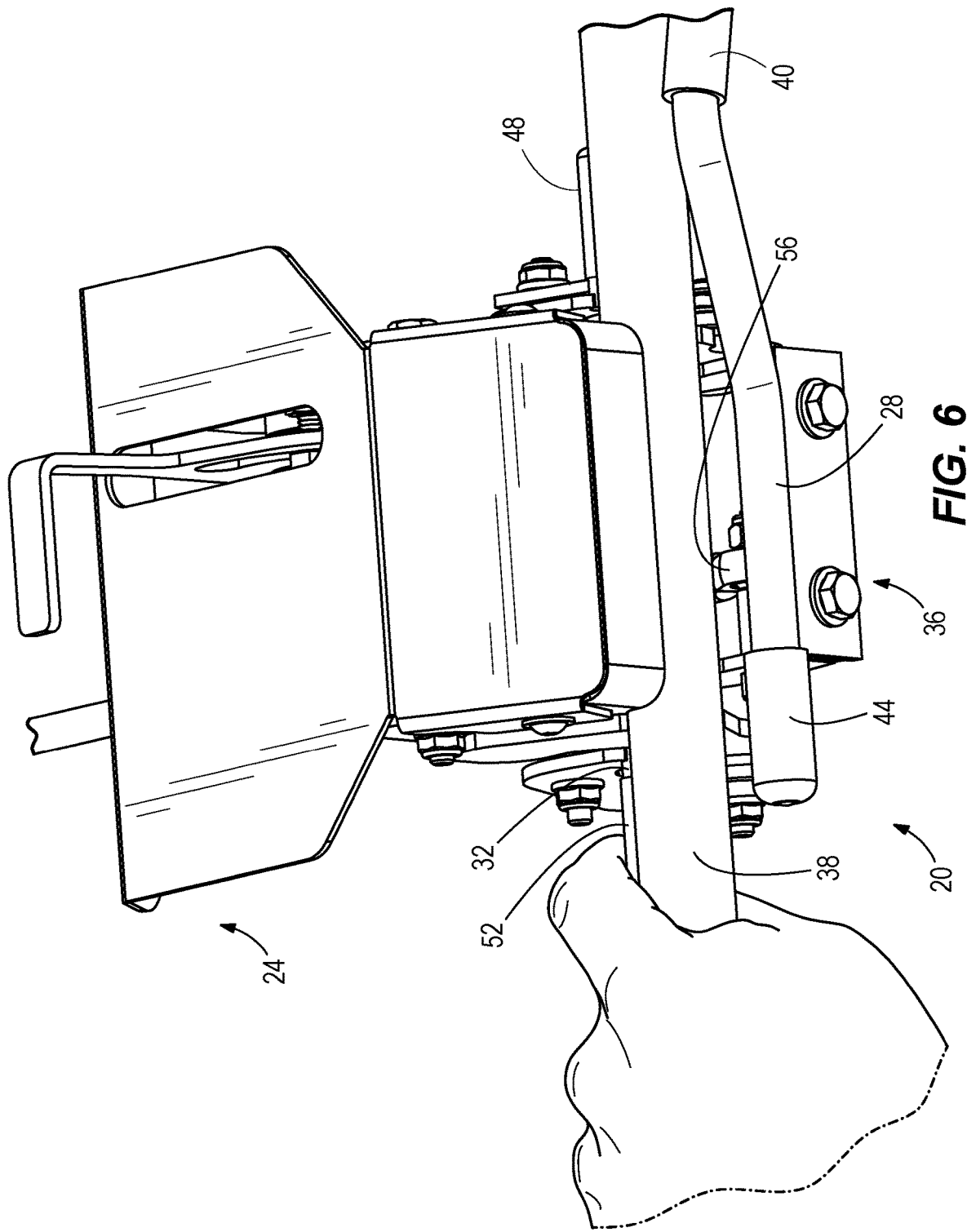
FIG. 6 is a perspective view of the user interface of FIG. 1 arranged in the reverse configuration.
Figure 7:
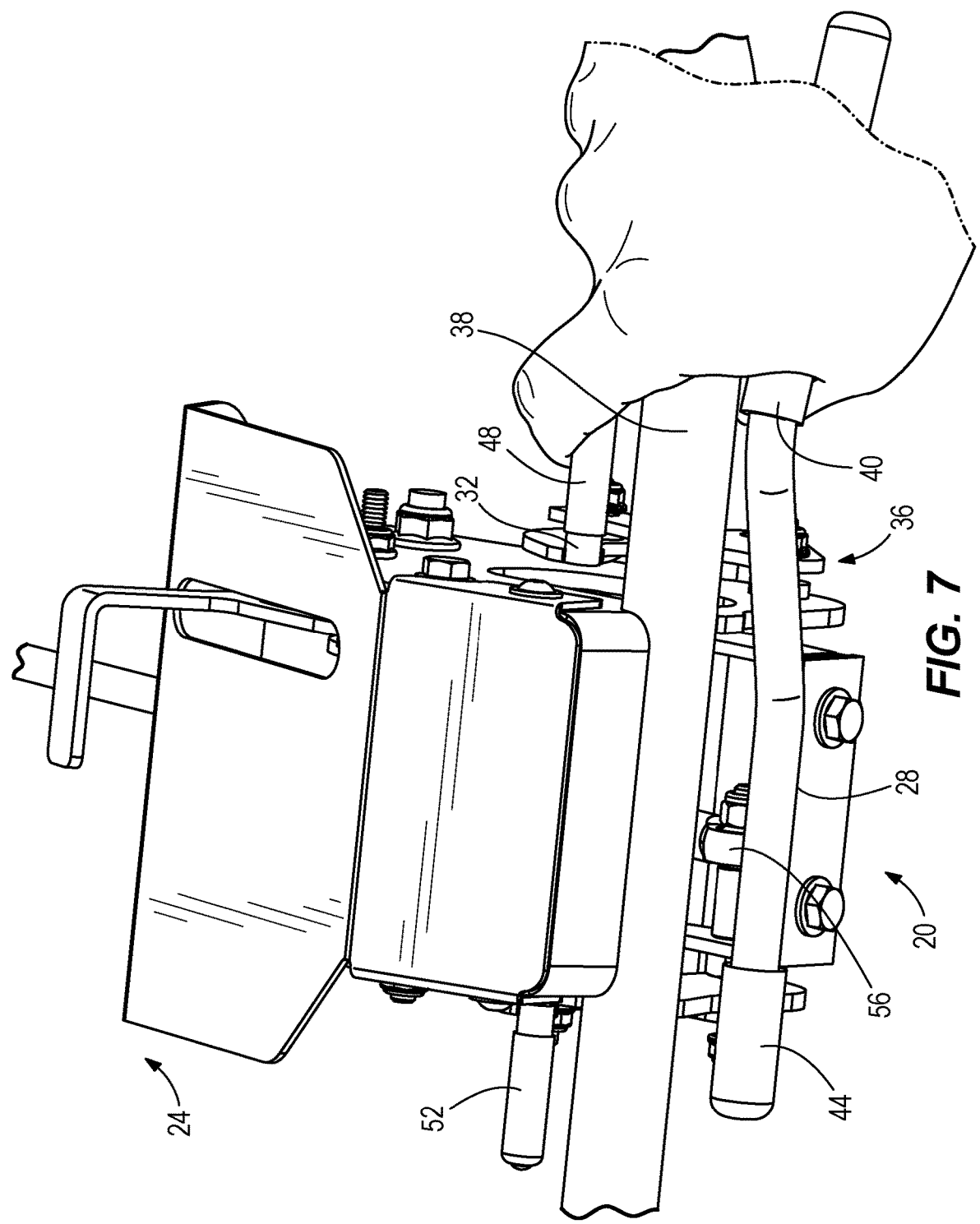
FIG. 7 is a perspective view of the user interface of FIG. 1 arranged in the reverse configuration.
Figure 8:
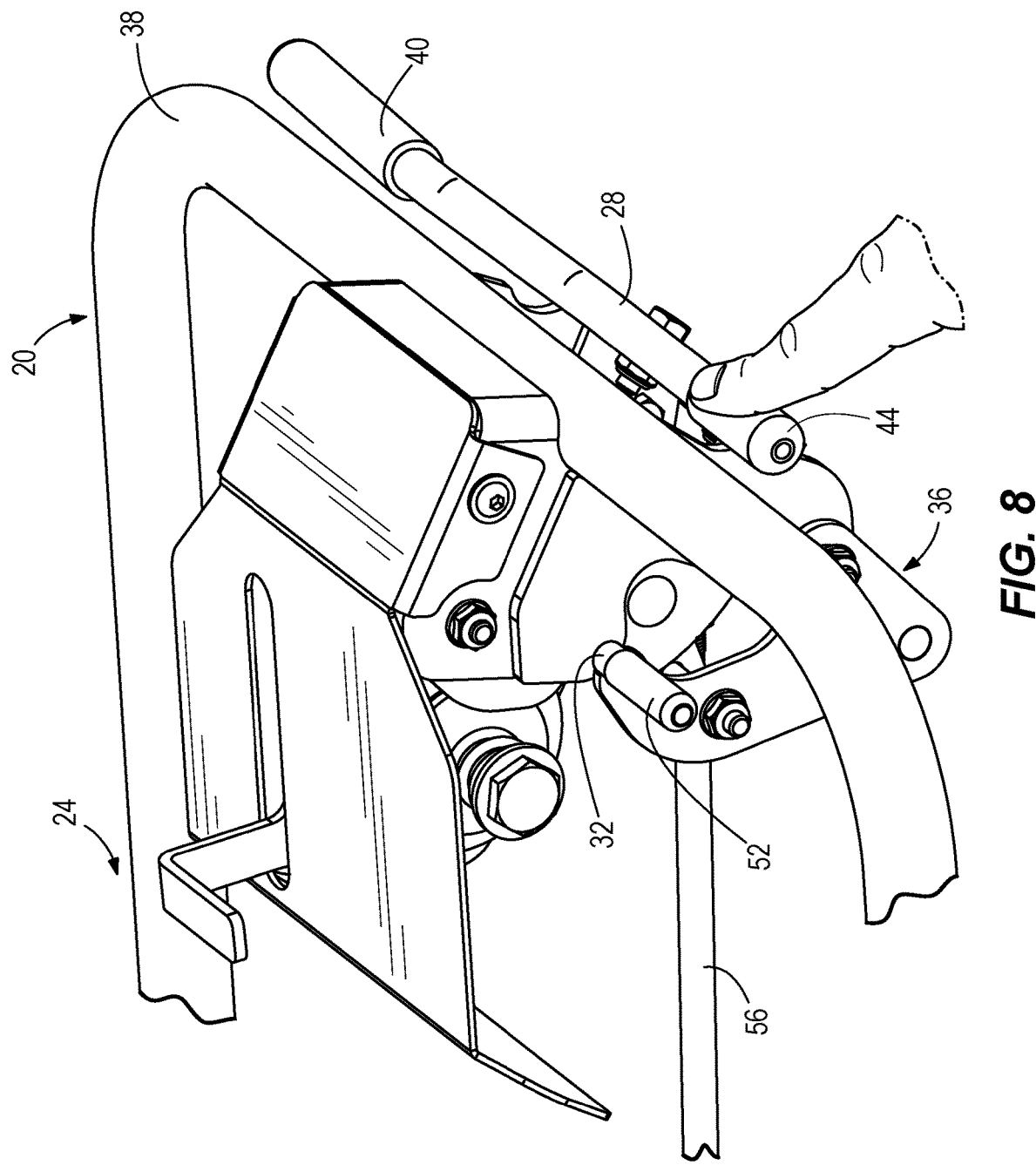
FIG. 8 is a perspective view of the user interface of FIG. 1 arranged in the forward configuration.
Figure 9:
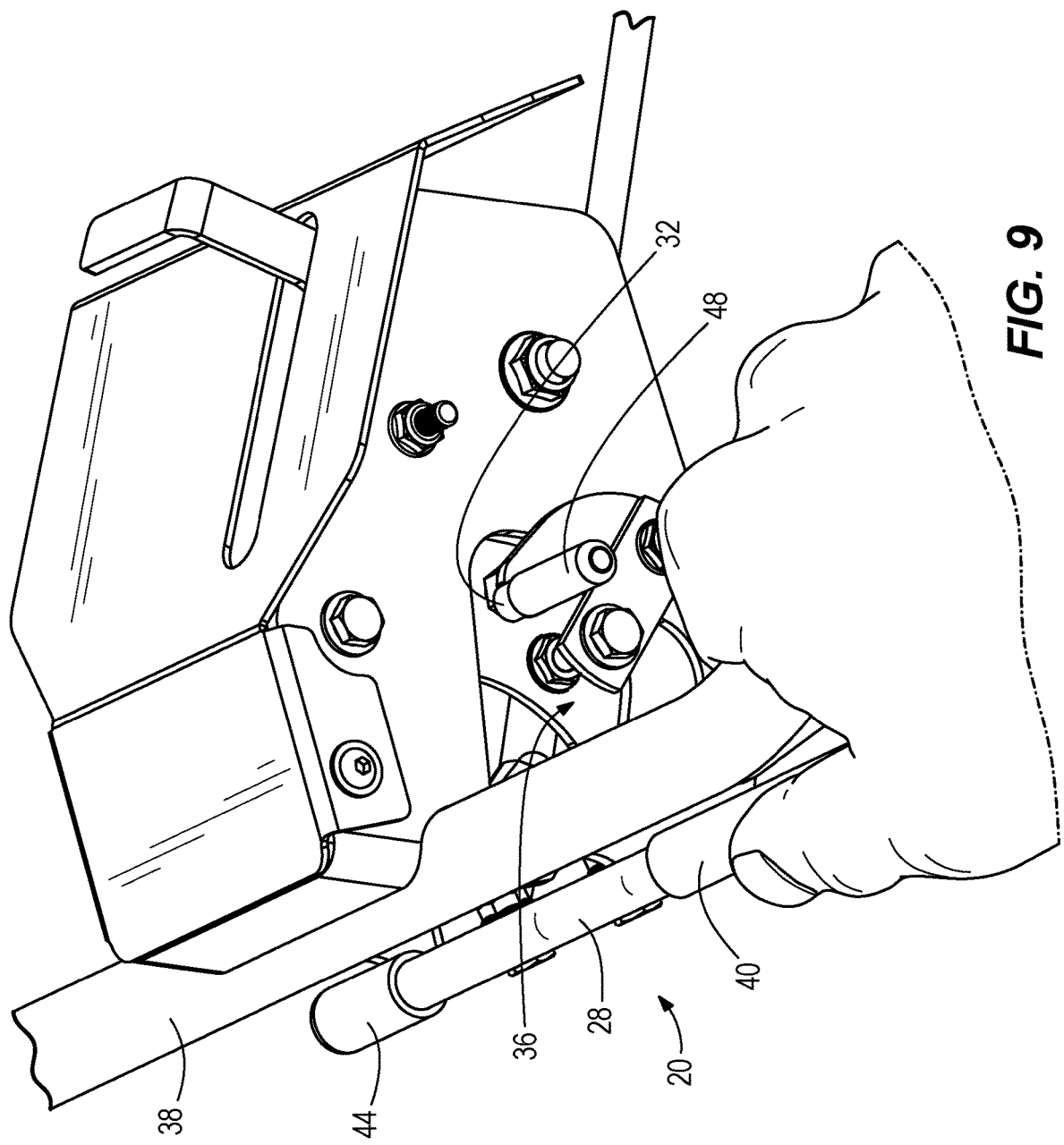
FIG. 9 is a perspective view of the user interface of FIG. 1 arranged in the forward configuration.
Figure 10:
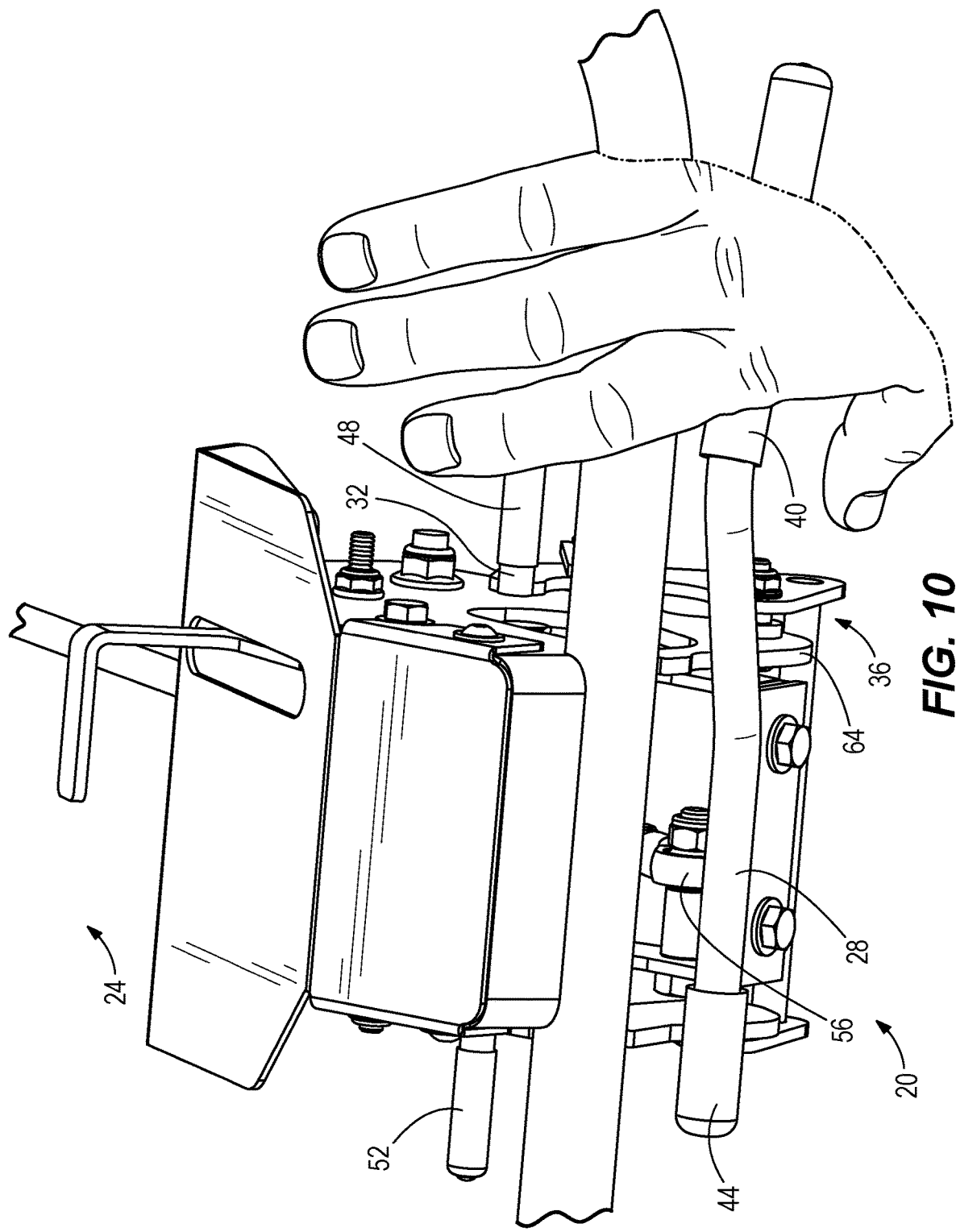
FIG. 10 is a perspective view of the user interface of FIG. 1 arranged in the forward configuration.
Figure 11:
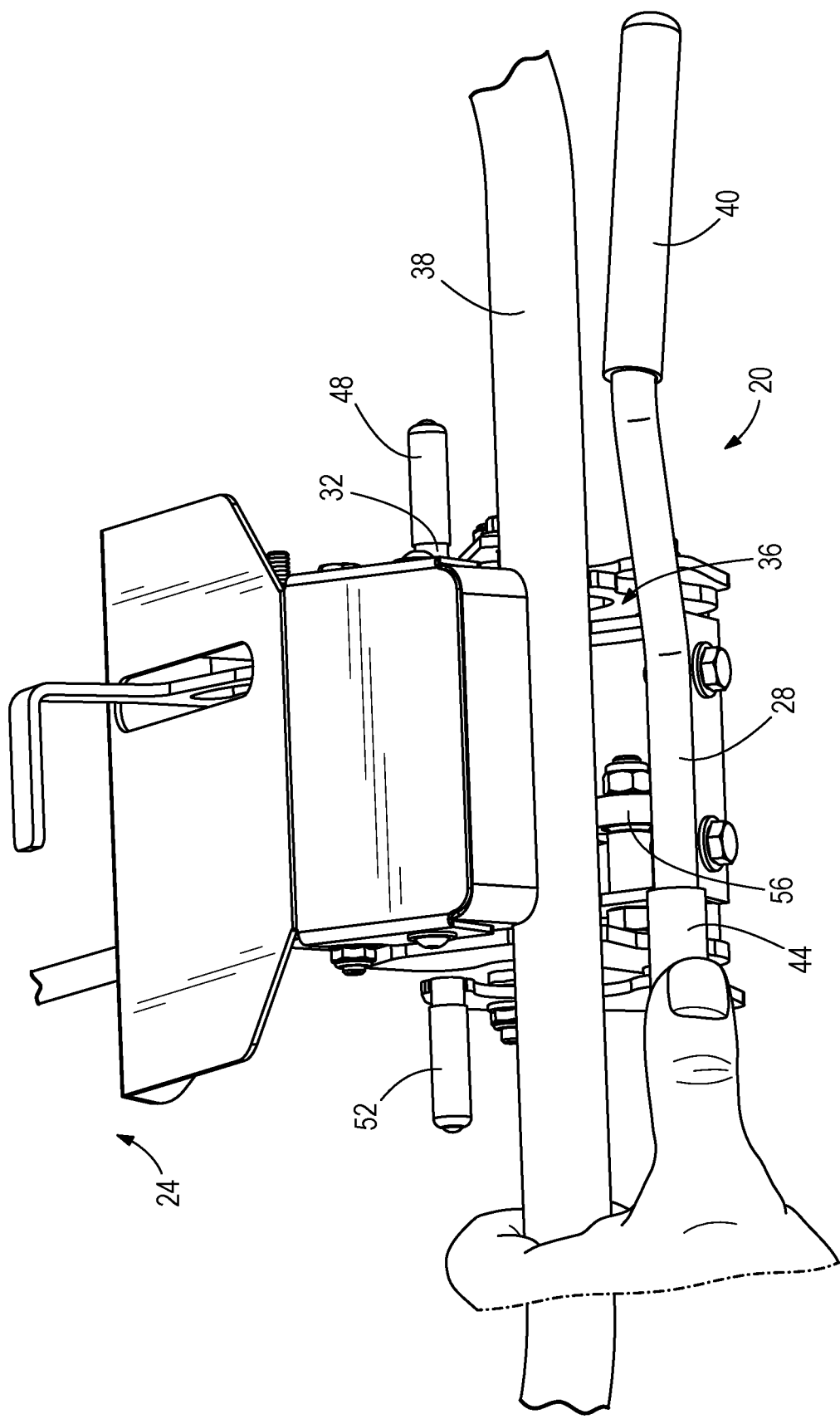
FIG. 11 is a perspective view of the user interface of FIG. 1 arranged in the forward configuration.

As shown in FIG. 4, the mechanical linkage 36 is coupled to a system of the outdoor power equipment (e.g., a transmission, a prime mover, etc.) with a control rod 56. The mechanical linkage 36 is structured to define a movement path of the forward lever 28 and the reverse lever 32 relative to the handle 38 that is conducive to single handed operation while allowing for forward/reverse control of the system with a single control rod 56.

As discussed briefly above, the user interface 20 is movable between a neutral configuration (shown in FIGS. 1-3) where no motive power is provided, a reverse configuration where the outdoor power equipment 24 is moved in a reverse direction (shown in FIGS. 4-7), and a forward configuration where the outdoor power equipment 24 is moved in a forward direction (shown in FIGS. 8-11). As shown in FIGS. 4-7, the reverse lever 32 can be manipulated to the reverse position while grasped by a single hand of the user and while the user maintains a grasp on the handle 38. As shown in FIGS. 8-11, the forward lever 28 can be manipulated to the forward position while grasped by a single hand of the user and while the user maintains a grasp on the handle 38. The mechanical linkage 36 is structured so that movement of the reverse lever 32 to the reverse position results in a relatively small movement of the forward lever 28, thereby allowing the user to maintain a grasp on the handle 38.

Figure 12:
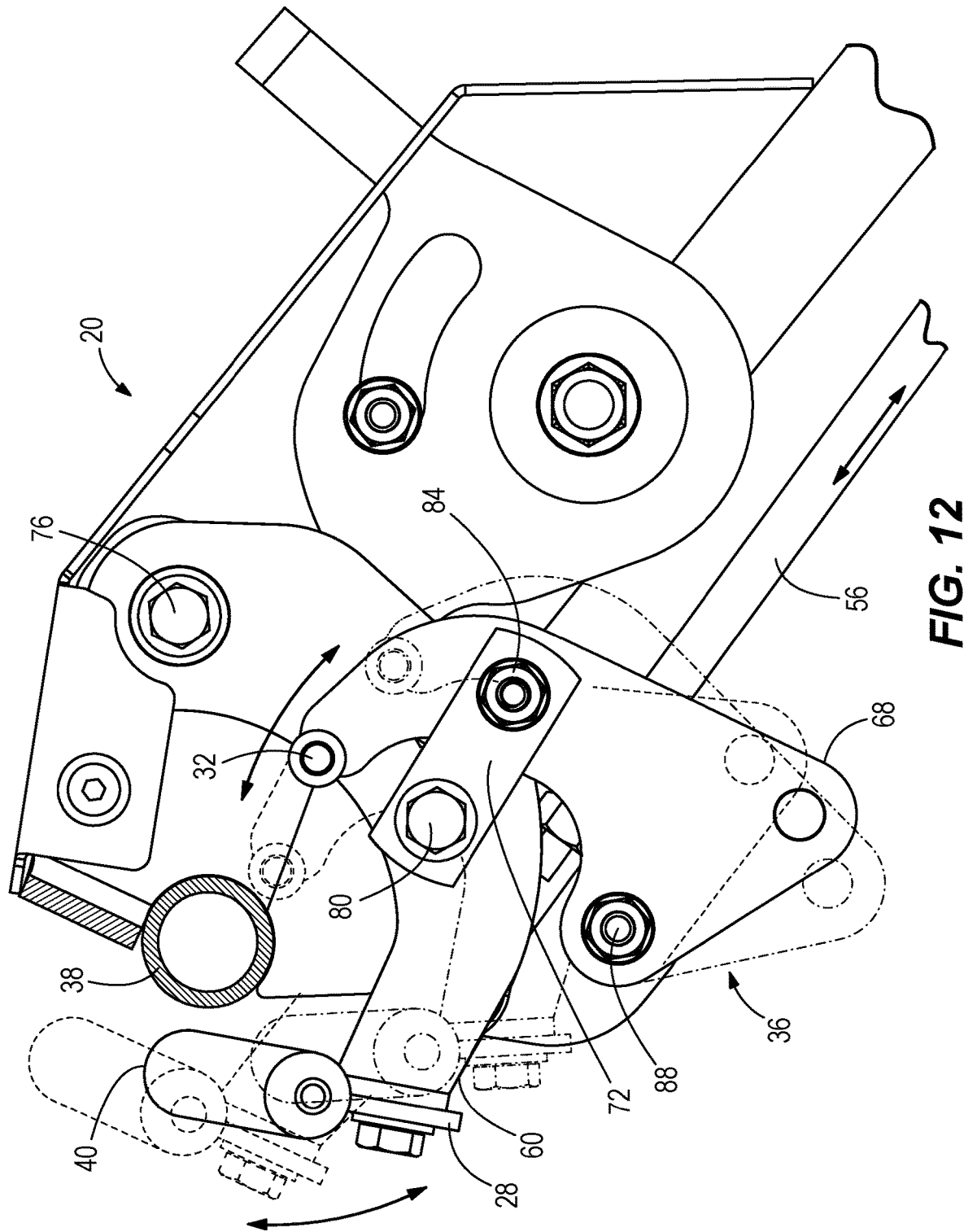
FIG. 12 is a right side view of a user interface for an outdoor power equipment arranged according to some embodiments.

As shown in FIG. 12, the mechanical linkage 36 can include a four bar linkage including a forward link 60 coupled to the forward lever 28, a static link 64 coupled to the handle 38, a reverse link 68 coupled to the reverse lever 32, and a joining link 72 coupling the forward link 60 to the reverse link 68. A forward-static joint 76 couples the forward link 60 to the static link 64 so that the forward link 60 rotates relative to the static link 64 about the forward-static joint 76. A forward-joining joint 80 couples the forward link 60 to the joining link 72 so that the forward link 60 and the joining link 72 rotate relative to one another about the forward-joining joint 80. A reverse-joining joint 84 couples the reverse link 68 to the joining link 72 so that the reverse link 68 and the joining link 72 rotate relative to one another about the reverse-joining joint 84. A reverse-static joint 88 couples the reverse link 68 to the static link 64 so that the reverse link rotates relative to the static link 64 about the reverse-static joint 88. The static link 64 rigidly connects the forward-static joint 76 and the reverse-static joint 88 and fixes the forward-static joint 76 and the reverse-static joint 88 relative to the handle 38.

Figure 13:
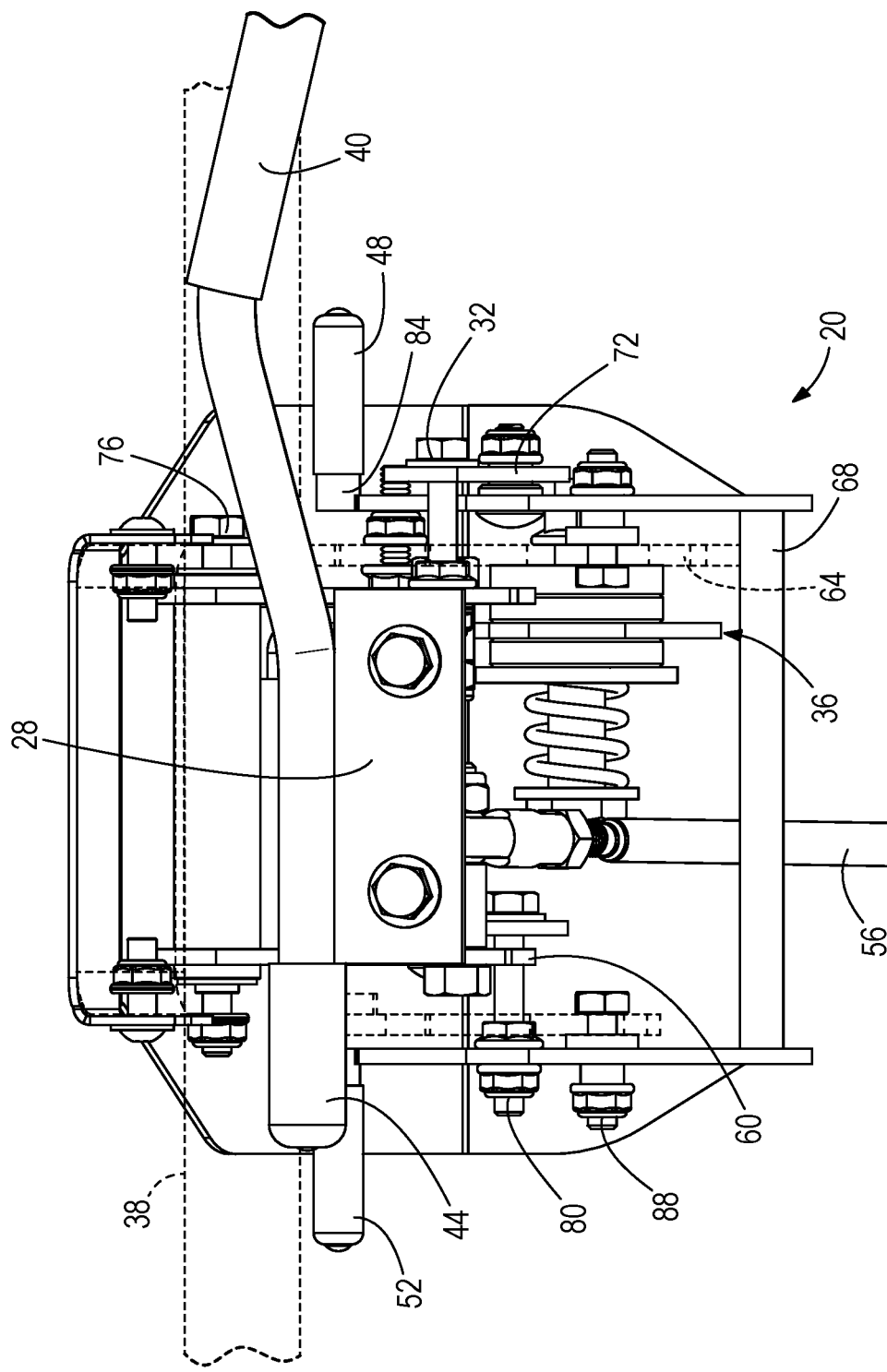
FIG. 13 is a rear view of the user interface of FIG. 12 arranged in the forward configuration.
Figure 14:
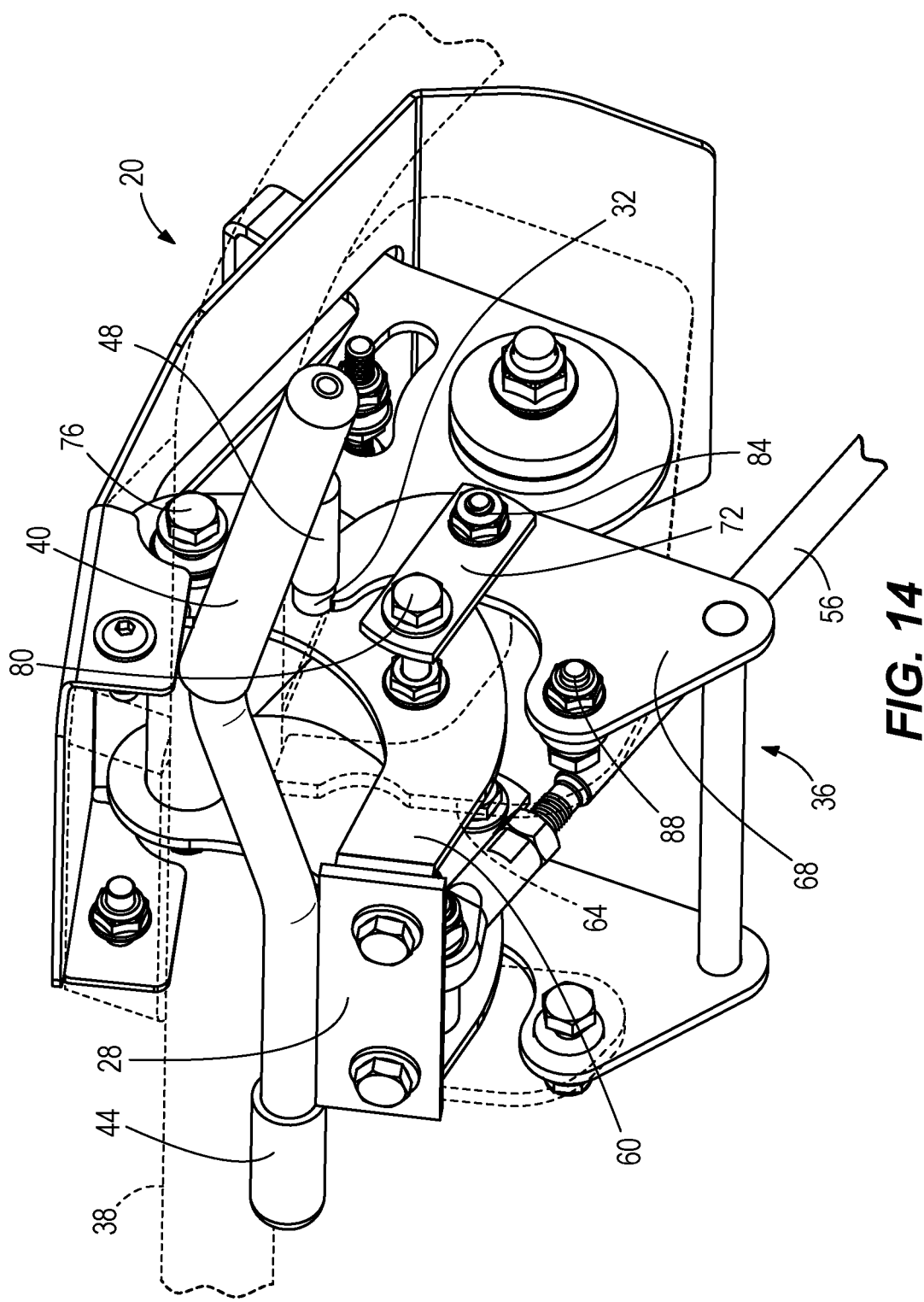
FIG. 14 is a perspective view of the user interface of FIG. 12 arranged in the forward configuration.
Figure 15:
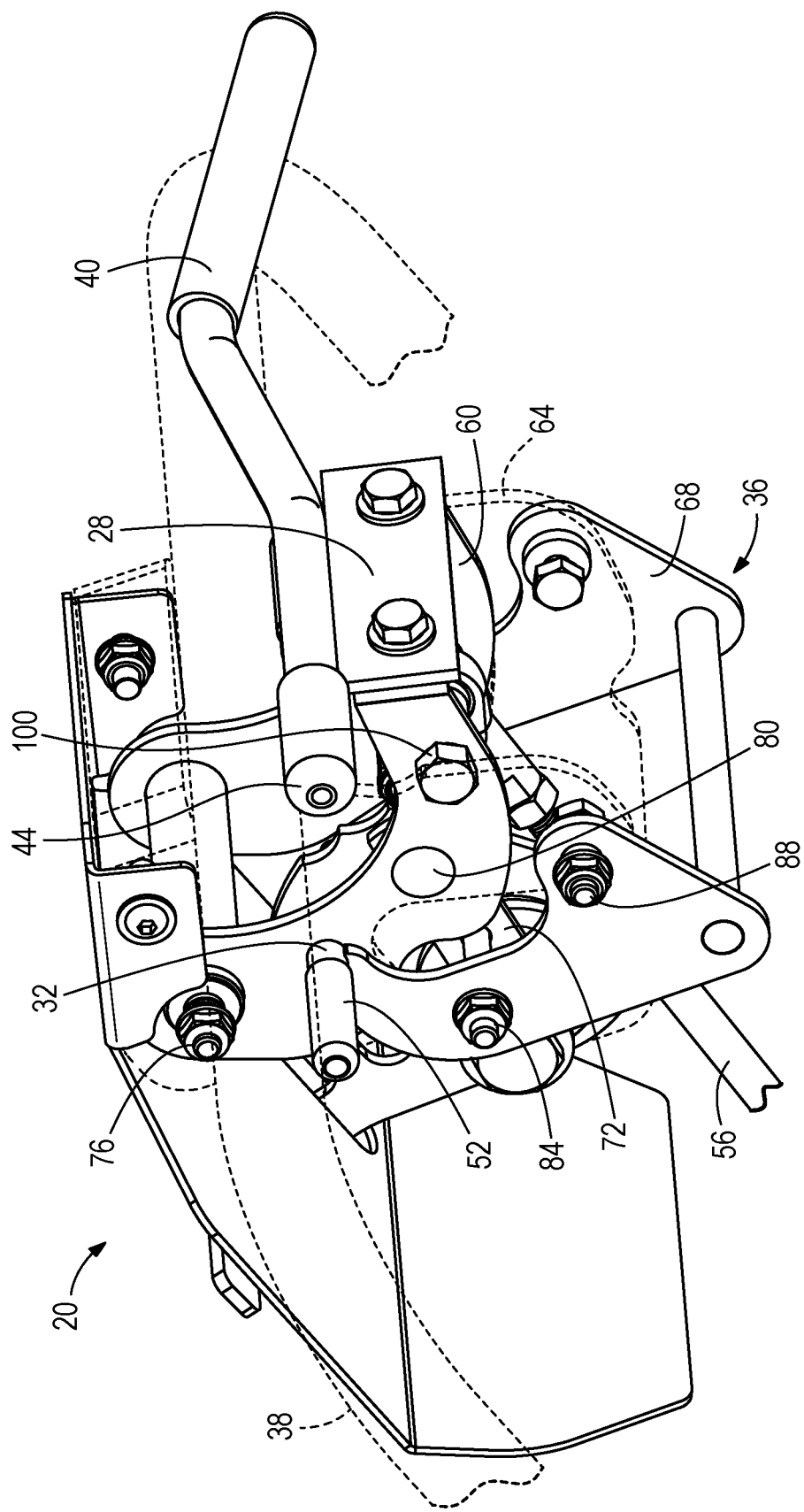
FIG. 15 is a perspective view of the user interface of FIG. 12 arranged in a reverse configuration.
Figure 16:
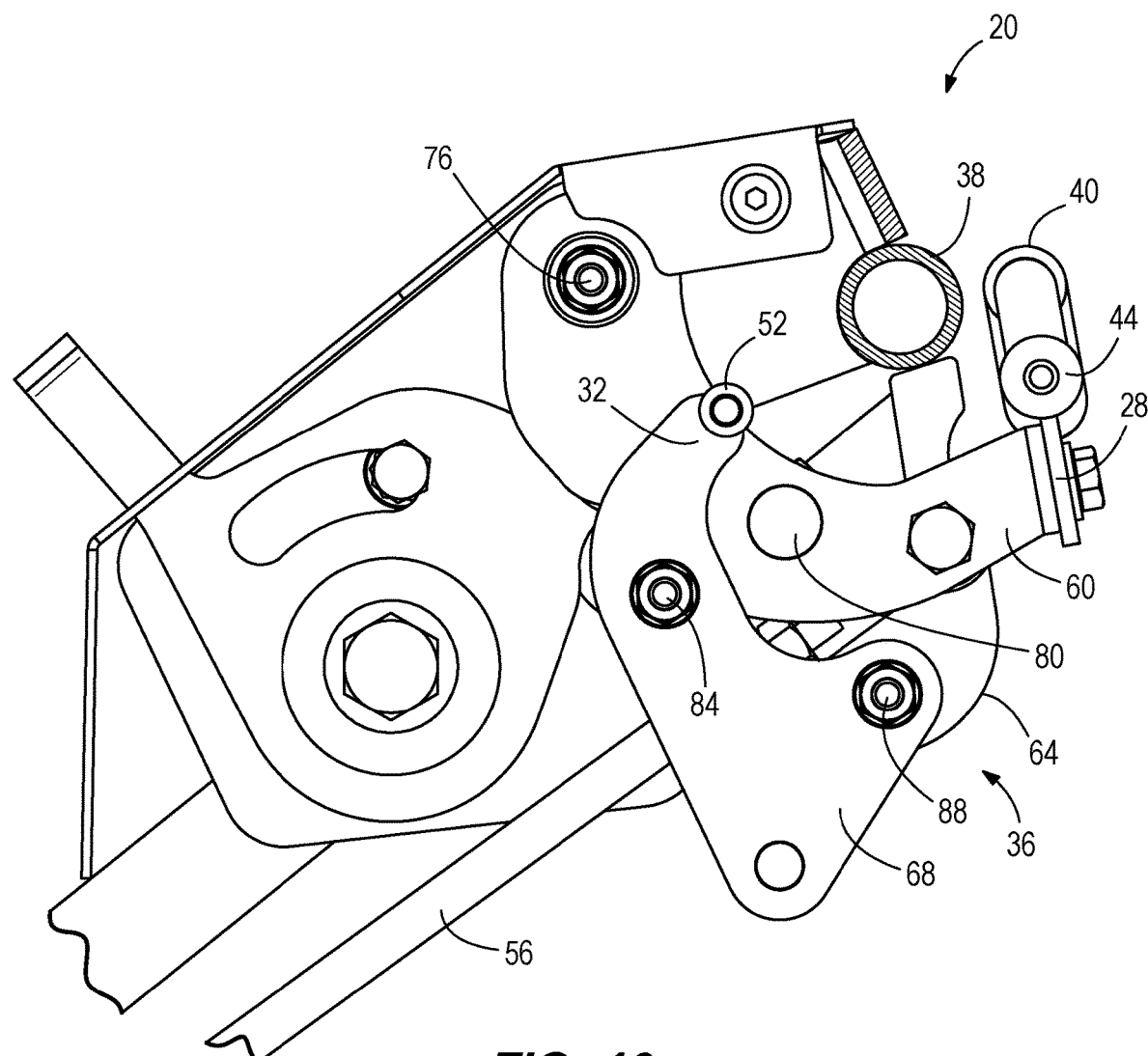
FIG. 16 is a rear view of the user interface of FIG. 12 arranged in the forward configuration.
Figure 17:
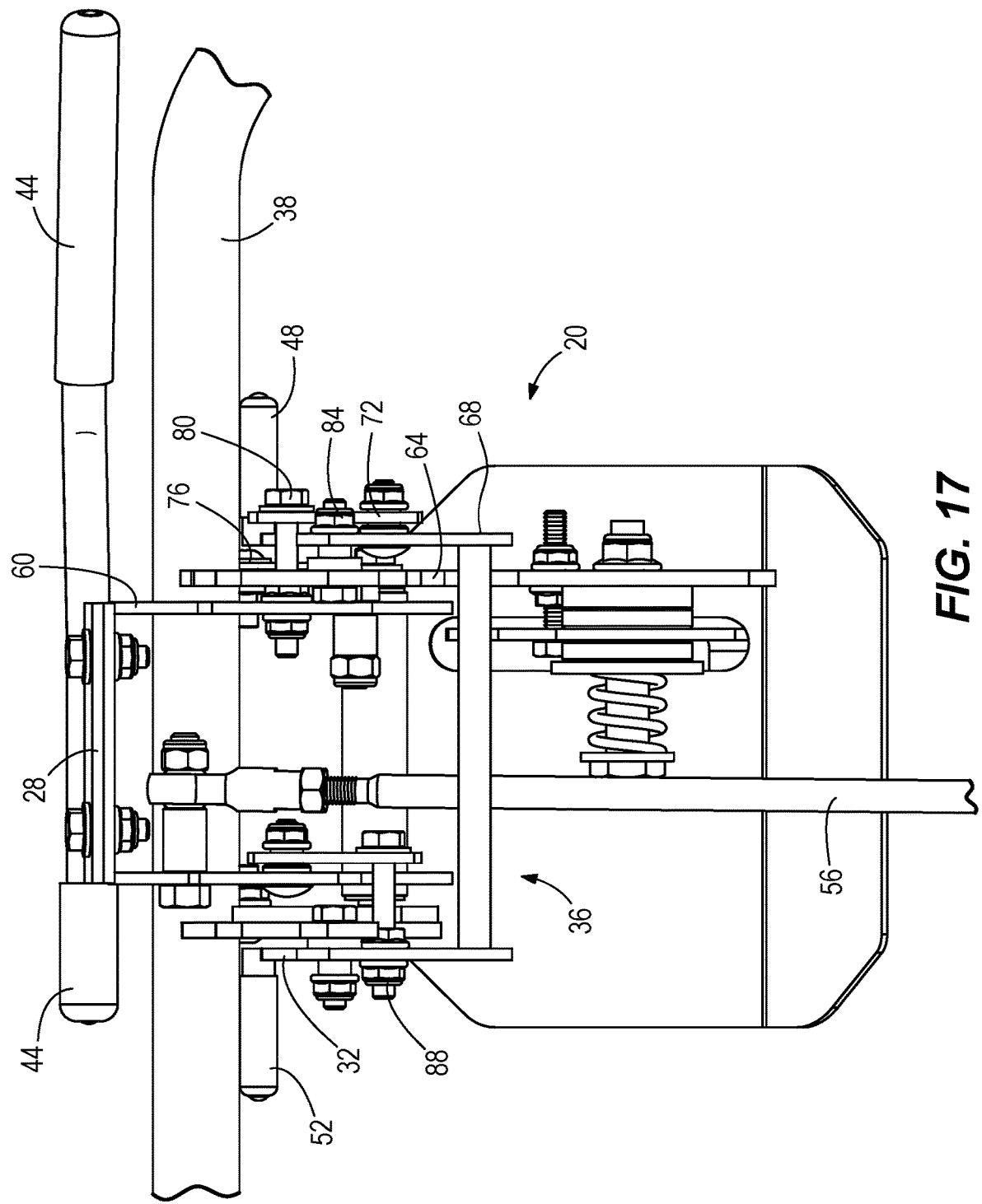
FIG. 17 is a rear view of the user interface of FIG. 12 arranged in the reverse configuration.
Figure 18:
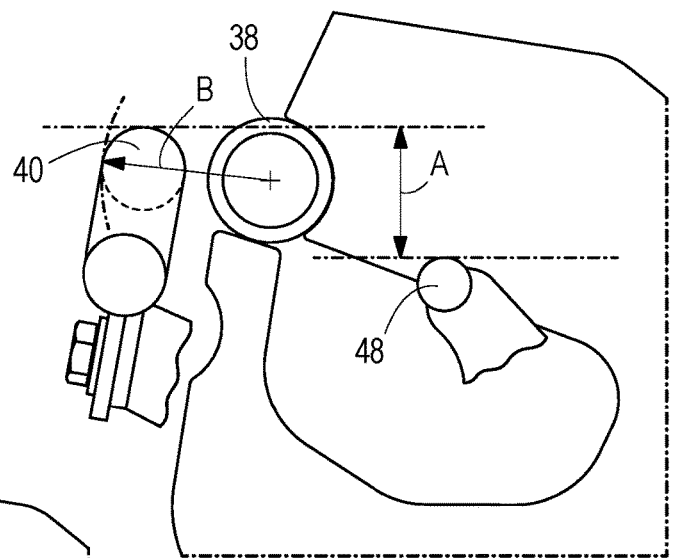
FIG. 18 is a right side view of the user interface of FIG. 12 arranged in the neutral configuration.

As shown in FIG. 12, the user interface 20 is actuatable by the user between the neutral configuration shown in solid lines, the forward configuration and the reverse configuration both down in broken lines. FIGS. 13, 14, and 16 show the user interface 20 arranged in the forward position. FIGS. 15, 17, and 18 show the user interface 20 arranged in the reverse position. Actuation of the user interface 20 results in movement of the control rod 56 and control of the outdoor power equipment 20 (e.g., via a transmission).

As shown in FIG. 15, in some embodiments, the control rod 56 is coupled to the forward link 60 at an actuation joint 100. The actuation joint 100 is positioned to provide an actuation throw length in both a forward and reverse direction that allows the transmission (or other component) to act in response to actuation of the user interface 20 between the forward configuration, the neutral configuration, and the reverse configuration.

The mechanical linkage 36 shown in FIGS. 1-18 includes a left side and a right side so that the mechanical linkage 36 is balanced. Each link includes matching (though not necessarily identical) pairs on the left side and the right side. In some embodiments, the mechanical linkage 36 does not include matching links on the right side and the left side and rather includes a linkage only on one side or the other.

The user interface 20 allows a user to actuate or operate the outdoor power equipment 24 with a single hand. Additionally, the use of a single control rod 56 simplifies the operation of a transmission or other system coupled to the user interface 20.

As shown in FIG. 18, the user interface 20 is arranged in the neutral configuration and a neutral vertical distance A is defined between top surfaces of the primary forward grip 40 and the right reverse grip 48. In some embodiments, the neutral vertical distance A is about 0.65 inches. In some embodiments, the neutral vertical distance A is between about 0.33 inches and about 1.00 inch. A neutral radius B is defined between a central axis of the handle 38 and an outer surface of the primary forward grip 40 when the user interface 20 is in the neutral configuration. In some embodiments, the neutral radius B is about 0.83 inches. In some embodiments, the neutral radius B is between about 0.50 inches and about 1.25 inches.

Figure 19:
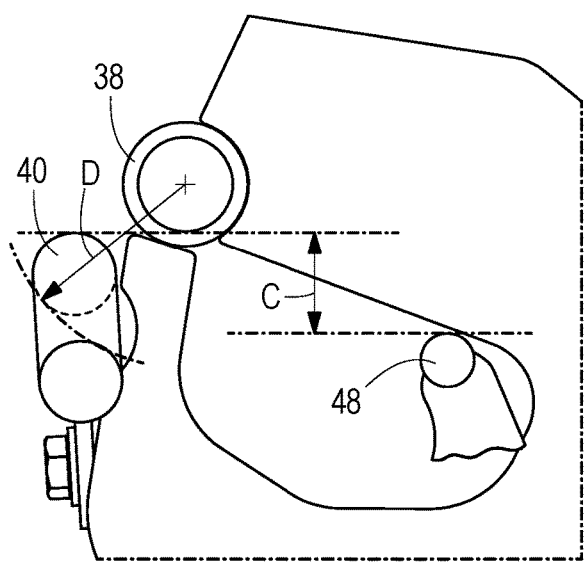
FIG. 19 is a right side view of the user interface of FIG. 12 arranged in the forward configuration.

As shown in FIG. 19, the user interface 20 is arranged in the forward configuration and a forward vertical distance C is defined between top surfaces of the primary forward grip 40 and the right reverse grip 48. In some embodiments, the forward vertical distance C is about 0.50 inches. In some embodiments, the forward vertical distance C is between about 0.25 inches and about 0.75 inch. A forward radius D is defined between the central axis of the handle 38 and an outer surface of the primary forward grip 40 when the user interface 20 is in the forward configuration. In some embodiments, the forward radius D is about 0.90 inches. In some embodiments, the forward radius D is between about 0.50 inches and about 1.38 inches.

Figure 20:
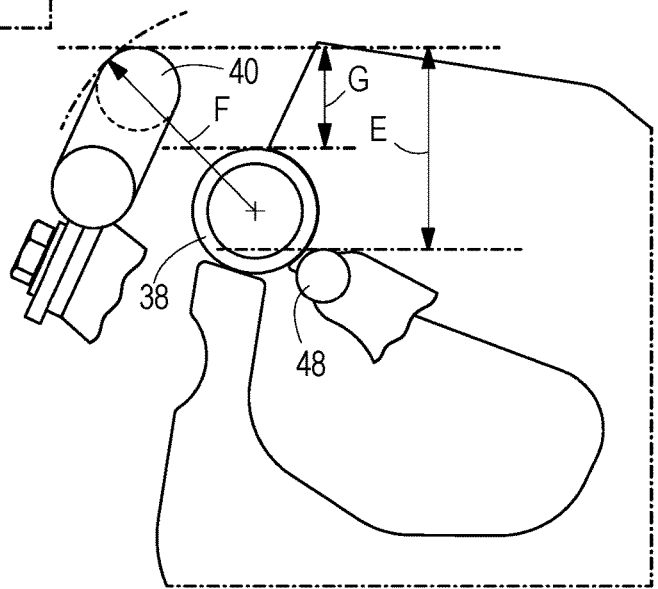
FIG. 20 is a right side view of the user interface of FIG. 12 arranged in the reverse configuration.

As shown in FIG. 20, the user interface 20 is arranged in the reverse configuration and a reverse vertical distance E is defined between top surfaces of the primary forward grip 40 and the right reverse grip 48. In some embodiments, the reverse vertical distance E is about 1.00 inch. In some embodiments, the reverse vertical distance E is between about 0.50 inches and about 1.50 inches. A maximum radius in the form of a reverse radius F is defined between the central axis of the handle 38 and an outer surface of the primary forward grip 40 when the user interface 20 is in the reverse configuration. In some embodiments, the reverse radius F is about 1.00 inch. In some embodiments, the reverse radius F is between about 0.50 inches and about 1.50 inches. A maximum vertical grip distance G is defined between top surfaces of the primary forward grip 40 and the handle 38 when the user interface 20 is in the reverse configuration. In some embodiments, the maximum vertical grip distance G is about 0.50 inches. In some embodiments, the maximum vertical grip distance G is between about 0.25 inches and about 0.75 inches. In some embodiments, the maximum vertical grip distance G is less than half an inch (<0.5").

In some embodiments, the maximum radius and the maximum vertical grip distance are defined in a different configuration (e.g., the forward configuration or between defined configurations). The maximum radius and the maximum vertical grip distance are defined by the structure of the mechanical linkage 36 and are sized so that the user can grasp the handle 38 securely while actuating the reverse lever 32 into the reverse configuration. That is to say, an average user's hand can easily grasp around the forward lever 28 (e.g., the primary grip 40) and the handle 38 while engaging the reverse lever 32. In some embodiments, the maximum vertical grip distance is less than half an inch (<0.50 inches) and the maximum radius is less than 1.05 inches.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and configuration of the user interface as shown in the various exemplary embodiments is illustrative only. Additionally, any element disclosed in one embodiment may be incorporated or utilized with any other embodiment disclosed herein. For example, the mechanical linkage 36 of the exemplary embodiment described in at least paragraph 15 may be incorporated in the walk behind lawn mower 24 of the exemplary embodiment described in at least paragraph 10. Although only one example of an element from one embodiment that can be incorporated or utilized in another embodiment has been described above, it should be appreciated that other elements of the various embodiments may be incorporated or utilized with any of the other embodiments disclosed herein. Although only a few embodiments have been described in detail in this disclosure, many modifications are possible (e.g., variations in sizes, dimensions, structures, shapes and proportions of the various elements, values of parameters, mounting configurations, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and configuration of the various exemplary embodiments without departing from the scope of the present invention.

What is claimed is:

1. Outdoor power equipment, comprising:
   a frame including a handle;
   a prime mover mounted to the frame;
   a transmission coupling the prime mover to a wheel; and
   a user interface coupled to the transmission and including:
      a static link rigidly coupled to the handle,
      a forward link coupled to a forward lever and to the static link,
      a reverse link coupled to a reverse lever and to the static link, and
      a joining link coupled between the forward link and the reverse link,
   wherein the user interface is actuatable between a forward configuration and a reverse configuration.

2. The outdoor power equipment of claim 1, the forward lever defines a topmost grip surface, and the handle defines a topmost handle surface, and a primary grip maximum distance is defined between the topmost grip surface and the topmost handle surface when the user interface is arranged in the reverse configuration.

3. The outdoor power equipment of claim 2, wherein the primary grip maximum distance is less than or equal to half an inch.

4. The outdoor power equipment of claim 2, wherein the primary grip maximum distance is less than about three-quarters of an inch.

5. The outdoor power equipment of claim 1, wherein a maximum radius equal to or less than 1.05 inches is defined between the handle and the forward lever.

6. The outdoor power equipment of claim 1, further comprising a single control rod coupling the user interface and the transmission.

7. The outdoor power equipment of claim 6, wherein the single control rod is coupled to the forward link.

8. The outdoor power equipment of claim 1, wherein a radius defined between a central axis of the handle and an outer surface of the forward lever is always less than 1.05 inches.

9. The outdoor power equipment of claim 1, wherein the forward lever includes a left grip and a right grip coupled to the left grip, and the reverse lever includes a left grip and a right grip coupled to the left grip.

10. A user interface comprising:
    a static link rigidly coupled to a handle;
    a forward link coupled to a forward lever and to the static link;
    a reverse link coupled to a reverse lever and to the static link; and
    a joining link coupled between the forward link and the reverse link,
    wherein the user interface is actuatable between a forward configuration and a reverse configuration.

11. The user interface of claim 10, the forward lever defines a topmost grip surface, and the handle defines a topmost handle surface, and a primary grip maximum distance is defined between the topmost grip surface and the topmost handle surface when the user interface is arranged in the reverse configuration.

12. The user interface of claim 11, wherein the primary grip maximum distance is about half an inch.

13. The user interface of claim 10, wherein a maximum radius equal to or less than 1.05 inches is defined between the handle and the forward lever.

14. The user interface of claim 10, wherein a distance between top surfaces of the forward lever and the reverse lever is about one half inch or less in all configurations of the user interface.

15. The user interface of claim 14, wherein a radius defined between a central axis of the handle and an outer surface of the forward lever is always less than 1.05 inches.

16. A user interface comprising:
    a static linkage;
    a first linkage coupled to the static linkage;
    a second linkage coupled to the static linkage;
    a joining linkage coupled between the first linkage and the second linkage;
    a first handlebar coupled to the first linkage;
    a second handlebar coupled to the second linkage; and
    a control rod coupled to the first linkage or the second linkage so that pivotal movement of the first handlebar or the second handlebar results in movement of the control rod between a forward position and a reverse position.

17. The user interface of claim 16, wherein the control rod includes a neutral position between the forward position and the reverse position.

18. The user interface of claim 16, wherein the control rod is coupled to the first linkage.

19. The user interface of claim 16, wherein a distance between top surfaces of the first handlebar and the second handlebar is about one half inch or less in all configurations of the user interface.

20. The user interface of claim 16, wherein the first handlebar and the second handlebar both include a left grip and a right grip coupled to the left grip.

* * * * *